United States Patent
Aoyama et al.

(10) Patent No.: US 12,512,272 B2
(45) Date of Patent: Dec. 30, 2025

(54) ELECTROLYTIC CAPACITOR MANUFACTURING METHOD

(71) Applicant: Panasonic Intellectual Property Management Co., Ltd., Osaka (JP)

(72) Inventors: Tatsuji Aoyama, Kyoto Fu (JP); Tomoyuki Tashiro, Yamaguchi Ken (JP); Shumpei Matsushita, Yamaguchi Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 153 days.

(21) Appl. No.: 18/546,916

(22) PCT Filed: Feb. 24, 2022

(86) PCT No.: PCT/JP2022/007525
§ 371 (c)(1),
(2) Date: Aug. 17, 2023

(87) PCT Pub. No.: WO2022/181667
PCT Pub. Date: Sep. 1, 2022

(65) Prior Publication Data
US 2024/0145177 A1    May 2, 2024

(30) Foreign Application Priority Data
Feb. 26, 2021  (JP) ................................. 2021-029885

(51) Int. Cl.
*H01G 9/00*   (2006.01)
(52) U.S. Cl.
CPC ................................ *H01G 9/0032* (2013.01)
(58) Field of Classification Search
CPC ...... H01G 9/0032; H01G 9/00; H01G 9/0029; H01G 9/055; H01G 9/151; H01G 13/00; H01G 9/052
See application file for complete search history.

(56) References Cited

U.S. PATENT DOCUMENTS 3,323,914 A * 6/1967 Fincham ................. C22B 34/24
                                                       419/60
8,404,134 B2 * 3/2013 Imanaka ................ H01G 9/055
                                                       216/13
(Continued)

FOREIGN PATENT DOCUMENTS

JP    H03-096210 A    4/1991
JP    H04-312912 A    11/1992
(Continued)

OTHER PUBLICATIONS

International Search Report dated May 17, 2022 issued in International Patent Application No. PCT/JP2022/007525, with English translation.

*Primary Examiner* — Lawrence Averick
(74) *Attorney, Agent, or Firm* — Rimon P.C.

(57) ABSTRACT

The disclosed manufacturing method includes: a step (i) of preparing an anode substrate having a metal foil exposed at an end surface of the anode substrate; a step (ii) of connecting a plurality of anode lead members to the anode substrate and forming a second dielectric layer on the end surface; a step (iii) of forming a plurality of the anode bodies to which the anode lead members are connected by cutting the anode substrate at a predetermined length; a step (iv) of forming a laminate by laminating the anode body, a cathode body, and a separator; and a step (v) of impregnating the laminate with a conductive polymer and an electrolytic solution. Step (ii) includes: connecting the plurality of anode lead members to the anode substrate; and forming the second dielectric layer on the end surface by immersing the anode substrate in a chemical conversion liquid.

10 Claims, 3 Drawing Sheets

(56) References Cited

U.S. PATENT DOCUMENTS

| | | | |
|---|---|---|---|
| 8,822,010 B2* | 9/2014 | Naito | H01G 11/48 |
| | | | 428/137 |
| 9,105,406 B2* | 8/2015 | Eilertsen | H01G 9/145 |
| 9,496,090 B2* | 11/2016 | Eilertsen | H01G 9/145 |
| 10,096,430 B2* | 10/2018 | Ashino | H01G 9/145 |
| 2007/0242418 A1* | 10/2007 | Hashimoto | H01G 9/055 |
| | | | 29/25.41 |
| 2009/0212013 A1* | 8/2009 | Imanaka | H01G 9/045 |
| | | | 216/103 |
| 2011/0017982 A1* | 1/2011 | Naito | H01G 11/48 |
| | | | 257/40 |
| 2014/0111906 A1* | 4/2014 | Eilertsen | H01G 9/035 |
| | | | 29/25.42 |
| 2014/0293513 A1* | 10/2014 | Eilertsen | H01G 9/048 |
| | | | 216/6 |
| 2016/0276108 A1* | 9/2016 | Eilertsen | H01G 9/145 |
| 2017/0125170 A1* | 5/2017 | Ashino | H01G 9/145 |

FOREIGN PATENT DOCUMENTS

| | | |
|---|---|---|
| JP | H04-312913 A | 11/1992 |
| JP | 2007-095934 A | 4/2007 |
| JP | 2007-123569 A | 5/2007 |
| JP | 2007-180260 A | 7/2007 |
| JP | 2017-168740 A | 9/2017 |
| WO | 2007/020969 A1 | 2/2007 |
| WO | 2009/118774 A1 | 10/2009 |

* cited by examiner

ELECTROLYTIC CAPACITOR MANUFACTURING METHOD

CROSS-REFERENCE OF RELATED APPLICATIONS

This application is the U.S. National Phase under 35 U.S.C. § 371 of International Patent Application No. PCT/JP2022/007525, filed on Feb. 24, 2022, which in turn claims the benefit of Japanese Patent Application No. 2021-029885, filed on Feb. 26, 2021, the entire disclosures of which Applications are incorporated by reference herein.

TECHNICAL FIELD

The present disclosure relates to an electrolytic capacitor manufacturing method.

BACKGROUND ART

An electrolytic capacitor includes an anode body and a dielectric layer formed on a surface of the anode body. Generally, the dielectric layer is formed by anodizing (chemical conversion treatment) the surface of the anode body.

Conventionally, various anodizing methods have been proposed. PTL 1 (Japanese Laid-Open Patent Publication No. 2017-168740) discloses "an electrolytic capacitor manufacturing method including: a first step of winding an anode foil on which a first dielectric film is formed and a cathode foil facing the anode foil to fabricate a wound element; and a second step of immersing the wound element in a chemical solution stored in a conductive liquid storage tank while applying voltage between the anode foil and the liquid storage tank from a DC power supply, to form a second dielectric film on the anode foil, wherein in the second step, electricity is discharged from the cathode foil to lower the potential of the cathode foil".

Further, PTL 2 (Japanese Laid-Open Patent Publication No. H04(1992)-312912) and PTL 3 (Japanese Laid-Open Patent Publication No. H04(1992)-312913) disclose a method of manufacturing an electrode terminal for an electrolytic capacitor. For example, PTL 2 discloses "a method of manufacturing an electrode terminal for an electrolytic capacitor, the method including forming an aluminum tab including a flat portion, which has been subjected to chemical conversion, and round bar portions on both sides of the flat portion, connecting lead wires to the round bar portions, then crimping pieces of tape-shaped aluminum foil to the flat portion at predetermined intervals, then winding the portions of the aluminum tab around a take-up reel together with the aluminum foil, and then performing chemical conversion treatment again".

CITATION LIST

Patent Literature

[PTL 1] Japanese Laid-Open Patent Publication No. 2017-168740
[PTL 2] Japanese Laid-Open Patent Publication No. H04(1992)-312912
[PTL 3] Japanese Laid-Open Patent Publication No. H04(1992)-312913

SUMMARY OF INVENTION

Technical Problem

Electrolytic capacitors (hybrid electrolytic capacitors) using a conductive polymer and an electrolytic solution as electrolytes are used in various fields due to their excellent characteristics. Hybrid electrolytic capacitors are sometimes used in applications that require a high rated voltage. Therefore, it may not be preferable to form the dielectric layer of a hybrid electrolytic capacitor by directly using a dielectric layer forming method used for general aluminum electrolytic capacitors and solid electrolytic capacitors. In light of such circumstances, one object of the present disclosure is to provide a manufacturing method suitable for a hybrid electrolytic capacitor.

Solution to Problem

One aspect of the present disclosure relates to a manufacturing method of an electrolytic capacitor. The manufacturing method is a manufacturing method for an electrolytic capacitor including a laminate of an anode body having a predetermined length and a predetermined width and having a dielectric layer formed on a surface of the anode body, a separator, and a cathode body, the manufacturing method including: a step (i) of preparing an anode substrate including a strip-shaped metal foil having a length two times the predetermined length or more and having the predetermined width, and first dielectric layers formed on two major surfaces of the metal foil, the metal foil being exposed at an end surface of the anode substrate, a step (ii) of connecting a plurality of anode lead members to the anode substrate and forming a second dielectric layer on the end surface; a step (iii) of forming a plurality of the anode bodies to which the anode lead members are connected by cutting the anode substrate at the predetermined length after the step (ii); a step (iv) of forming the laminate by laminating the anode body, the cathode body, and the separator in such a manner that the separator is disposed between the anode body formed in the step (iii) and the cathode body; and a step (v) of impregnating the laminate with a conductive polymer and an electrolytic solution, wherein the step (ii) includes: a step (ii-a) of connecting the plurality of anode lead members to the anode substrate; and a step (ii-b) of forming the second dielectric layer on the end surface by immersing the anode substrate in a chemical conversion liquid and subjecting the anode substrate to chemical conversion treatment.

Advantageous Effects of Invention

According to the present disclosure, a hybrid electrolytic capacitor can be manufactured by a manufacturing method suitable for a hybrid electrolytic capacitor.

Although novel features of the present invention are set forth in the appended claims, the configuration and content of the present invention, as well as other objects and features of the present invention, will be better understood from the following detailed description with reference to the drawings.

DESCRIPTION OF EMBODIMENTS

Figure 1A:
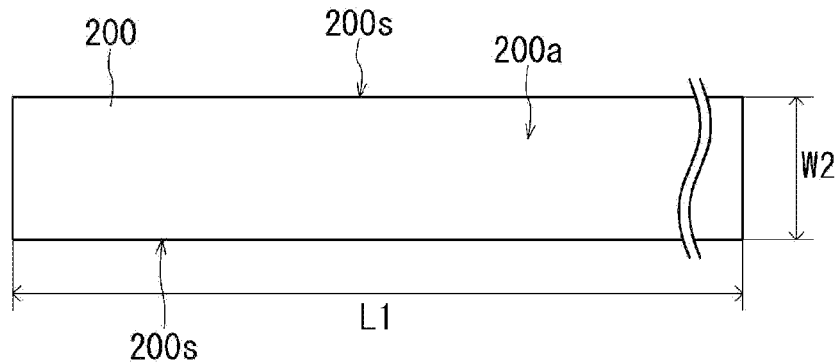
FIG. 1A A schematic diagram illustrating one step of an example of a manufacturing method according to the present disclosure.

Hereinafter, embodiments of a manufacturing method according to the present disclosure will be described with examples, but the present disclosure is not limited to the examples described below. In the following description, specific numerical values and materials may be exemplified, but other numerical values and materials may be employed as long as effects of the present disclosure can be obtained. In this specification, the description of the range "a numerical value A to a numerical value B" includes the numerical value A and the numerical value B, and can be read as "the numerical value A or more and the numerical value B or less". In the following description, when lower limits and upper limits are given for numerical values of a specific physical property, a condition, or the like, any of the given lower limits and any of the given upper limits can be arbitrarily combined as long as the lower limit is not greater than or equal to the upper limit.

[Electrolytic Capacitor Manufacturing Method]

The manufacturing method of the present embodiment is a manufacturing method for an electrolytic capacitor including a laminate of an anode body, which has a predetermined length L2 and a predetermined width W2 and has a dielectric layer formed on a surface thereof, a separator, and a cathode body. The separator is disposed between the anode body and the cathode body. The laminate may include a plurality of sheet-like anode bodies and a plurality of sheet-like cathode bodies, which are alternately arranged, and separators disposed between the anode bodies and the cathode bodies. Alternatively, the laminate may be a wound body formed by winding a strip-shaped anode body, a strip-shaped cathode body, and a strip-shaped separator such that the separator is disposed between the anode body and the cathode body. In the wound body, the anode body, the cathode body, and the separator are laminated in the radial direction of the wound body.

The predetermined width W2 may be 10 mm or more, 15 mm or more, or 20 mm or more. The width W2 may be 50 mm or less, or 40 mm or less. For example, the width W2 may be in a range of 10 mm to 50 mm, 15 to 50 mm, or 20 to 50 mm. In any of these ranges, the upper limit may be 40 mm.

The predetermined length L2 is longer than the width W2. The length L2 may be 100 mm or more, 200 mm or more, or 300 mm or more. The length L2 may be 1000 mm or less, or 800 mm or less. For example, the length L2 may be in a range of 100 to 1000 mm, 200 to 1000 mm, 300 to 1000 mm. In any of these ranges, the upper limit may be 800 mm. The length L2 may be 2 or more times the width W2, and may be 100 or less times the width W2.

The thickness of the anode body is not particularly limited, but may be in a range of 80 μm to 200 μm (for example, in a range of 100 μm to 130 μm).

The manufacturing method of the present embodiment includes the following steps (i) to (v) in this order.

(Step (i))

A step (i) is a step of preparing an anode substrate including a strip-shaped metal foil having a length L1 that is two times the predetermined length L2 (the length of the anode body of the electrolytic capacitor) or more and having the predetermined width W2 (the width of the anode body of the electrolytic capacitor), and first dielectric layers formed on two major surfaces of the metal foil, the metal foil being exposed at an end surface (a cut surface from another point of view) of the anode substrate. The metal foil is a metal foil (for example, an aluminum foil) that can be used as the anode body of the electrolytic capacitor. Generally, the two major surfaces of the anode body (the metal foil) are roughened (made porous from another point of view). The length L1 may be 2 or more times, 10 or more times, or 100 or more times the length L2, and may be 10000 or less times, 5000 or less times, or 1000 or less times the length L2. The length L1 may be in a range of 2 to 10000 times the length L2 (for example, in a range of 100 to 5000 times). A large number of anode bodies can be manufactured at once by increasing the value of L1/L2. On the other hand, handling of the anode substrate is made easier by setting the value of L1/L2 to an appropriate value or less.

A commercially available product may be used as the anode substrate. Alternatively, the anode substrate may be formed by the following method. First, after roughening the surfaces of a sheet metal foil, the first dielectric layer is formed on the roughened surfaces (step (i-a)). A length L0 of the sheet metal foil is 1 or more times (for example, a range of 1 to 10 times) the length L1, and a width W0 of the sheet metal foil is two times (for example, a range of 5 to 500 times) the width W2 or more. Roughening may be performed by a known method (for example, etching). The step (i-a) forms the first dielectric layer on the two major surfaces (more specifically, roughened major surfaces) of the sheet metal foil. The first dielectric layer may be formed by chemical conversion treatment. The first dielectric layer formed by the chemical conversion treatment is an oxide of a metal constituting the metal foil (the same applies to the chemical conversion treatment described below). For example, when the sheet metal foil is aluminum foil, a layer of aluminum oxide is formed by the chemical conversion treatment. There is no particular limitation on the methods and conditions of surface roughening and the chemical conversion treatment in the step (i), and known methods and conditions may be used.

The method of the chemical conversion treatment in the step (i-a) is not limited, and a known method of chemical conversion treatment used for forming a dielectric layer on the surface of an anode body of an electrolytic capacitor may be used. The thickness of the first dielectric layer is determined according to the performance required for the electrolytic capacitor. When manufacturing an electrolytic capacitor having a high rated voltage, the thickness of the first dielectric layer is increased. For example, when manufacturing an electrolytic capacitor with a rated voltage of 100 V, the thickness of the first dielectric layer may be 200 nm or more.

Next, the sheet metal foil after the step (i-a) is cut to a size corresponding to the anode substrate (step (i-b)). For example, the sheet metal foil wound into a roll may be cut into a plurality of rolls so that each roll has a width of W2. At this time, the dielectric layer is not provided on the cut surface (end surface), and the metal foil is exposed at the cut surface (end surface).

(Step (ii))

A step (ii) is a step of connecting a plurality of anode lead members to the anode substrate and forming a second dielectric layer on the end surface. The step (ii) includes a step (ii-a) of connecting the plurality of anode lead members to the anode substrate, and a step (ii-b) of forming the second dielectric layer on the end surface by immersing the anode substrate in a chemical conversion liquid and subjecting the anode substrate to chemical conversion treatment. Note that since the second dielectric layer is formed by chemical conversion treatment (anodization) of the anode substrate, it usually has the same material quality as the first dielectric layer. For example, when the anode substrate is made of aluminum, the second dielectric layer is a layer of aluminum oxide.

In the step (ii), the step (ii-b) is usually performed after the step (ii-a). However, the step (ii-a) may be performed after the step (ii-b).

The anode lead member is not particularly limited, and a known anode lead member may be used. For example, it is possible to use an anode lead member that includes a plate-like portion fixed and connected to the anode substrate, a bar-like portion continuous with the plate-like portion, or a lead portion continuous with the bar-like portion. The anode lead member can be formed of metal. The bar-like portion corresponds to a projecting portion to be described below. The plate-like portion is made of a metal such as aluminum. The bar-like portion may be a bar-like iron member having a surface coated with a metal (for example, copper and/or tin) other than iron. The metal coating the surface may be formed by plating or may be formed by another method. A metal wire can be used for the lead portion. An end portion (for example, the plate-like portion described above) of the anode lead member is fixed to the anode substrate by welding, crimping, or the like, and is electrically connected to the anode substrate.

The plurality of anode lead members are arranged at predetermined intervals. Typically, the interval is the same as the length L2 (the length of the anode body of the electrolytic capacitor). Thus, one anode lead member is disposed on one anode body when the anode substrate is cut in a step (iii).

In the step (ii-b), chemical conversion treatment is performed while at least the anode substrate is immersed in the chemical conversion liquid. The chemical conversion liquid may be an aqueous solution of an acid salt such as a phosphate, a borate, or an adipate, or may be another aqueous solution such as an aqueous solution of phosphoric acid.

In a typical wound-type electrolytic capacitor, the wound body, which includes an anode foil having a dielectric layer formed on a surface thereof, a cathode foil, and a separator, is first prepared, and then the dielectric layer is formed on an end surface (a portion where the dielectric layer is not formed) of the anode foil by subjecting the anode foil to chemical conversion treatment. In this case, the chemical conversion liquid tends to remain inside the wound body including the separator, and components of the chemical conversion liquid may have an adverse effect. Particularly when the width W2 is large, the chemical conversion liquid tends to remain inside the wound body. Therefore, in the conventional method, it has been difficult to use a chemical conversion liquid with a high concentration. However, in the method of the present disclosure, the end surface of the anode body is subjected to chemical conversion treatment before forming the wound body. Therefore, the chemical conversion liquid adhering to the surface of the anode body due to chemical conversion treatment can be easily removed by washing or the like after chemical conversion treatment. Therefore, in the method of the present disclosure, it is possible to use a chemical conversion liquid having a high concentration (in other words, a chemical conversion liquid having high electrical conductivity).

The electrical conductivity of the chemical conversion liquid may be 1 mS/cm or more, or may be 0.1 mS/cm or more. By setting the electrical conductivity of the chemical conversion liquid to 0.1 mS/cm or more, the speed of formation of the second dielectric layer can be increased. When manufacturing an electrolytic capacitor having a high rated voltage, it is necessary to increase the thickness of the second dielectric layer similarly to the first dielectric layer. Therefore, it is particularly important to increase the speed of formation of the second dielectric layer by using a chemical conversion liquid having a high concentration (a chemical conversion liquid having high electrical conductivity). The upper limit of the electrical conductivity of the chemical conversion liquid is not particularly limited, but may be 100 mS/cm or less.

The thickness of the second dielectric layer formed by the chemical conversion treatment in the step (ii-b) may be 200 nm or more, or may be 150 nm or more. By forming the second dielectric layer having a thickness of 150 nm or more in the step (ii-b), an electrolytic capacitor having a high rated voltage can be manufactured. The upper limit of the thickness of the second dielectric layer is not particularly limited, but may be 800 nm or less, for example (the same applies to the first dielectric layer).

The voltage applied during chemical conversion treatment may be 300 V or more, or may be 200 V or more. In the step (ii-b), the speed of formation of the second dielectric layer can be increased by subjecting the anode substrate to chemical conversion treatment with a chemical conversion voltage of 200 V or more. The upper limit of the applied voltage is not particularly limited, but may be 600 V or less.

In a typical conventional manufacturing method, the end surface of the anode body is subjected to chemical conversion treatment after forming the wound body including the anode body, the cathode body, and the separator. In that case, when chemical conversion treatment is performed with a high applied voltage (for example, 200 V or more), there is a problem that discharge occurs between the anode lead member to which the high voltage is applied and a cathode lead member present in the vicinity of the anode lead member. However, such a problem can be avoided by the method of the present disclosure.

In the step (ii-b), it is preferred that chemical conversion treatment is performed while a part of the anode lead member projecting from the anode substrate is also immersed in the chemical conversion liquid. Thus, a chemical conversion film (the dielectric layer) can be formed on the surface of the projecting part of the anode lead member as well.

The anode lead member may include a connecting portion made of metal and connected to the anode substrate, and a lead portion connected to the connecting portion. The connecting portion may include a plate-like portion in contact with the anode substrate, and a projecting portion projecting from the anode substrate and not in contact with the anode substrate. In a preferred example, the length of the projecting portion is 2 mm or more, and the length of the portion of the projecting portion immersed in the chemical conversion liquid is 1 mm or less in the step (ii-b). Thus, it is possible to prevent corrosion breakage of the lead member caused by the chemical conversion liquid reaching the joint between the projecting portion and the lead portion, and insufficient formation of the chemical conversion film (the dielectric layer). The upper limit of the length of the projecting portion is not particularly limited, but may be 5 mm or less, for example. The length of the portion of the projecting portion immersed in the chemical conversion liquid is, for example, 0 mm or more, and the projecting portion does not need to be immersed in the chemical conversion liquid. The projecting portion is the bar-like portion described above, for example.

In the step (ii-b), chemical conversion treatment may be performed while the anode substrate is flat, or may be performed while the anode substrate is rolled. For example, chemical conversion treatment may be performed in the state where the anode substrate is wound into a roll. At this time, when a certain gap is provided between the portions of the anode substrate that are overlap each other in the radial direction of the roll, the chemical conversion liquid sufficiently spreads in the roll. Therefore, unlike the case where chemical conversion treatment is performed on a wound body of a capacitor element, it is possible to form the dielectric layer with little variation depending on the location. In the step (ii-b), chemical conversion treatment can be performed efficiently by performing chemical conversion treatment in the state where the anode substrate is wound. Note that when the width W2 is large, and chemical conversion treatment is performed on the wound body of the capacitor element, the chemical conversion liquid does not spread sufficiently over the whole wound body, and variation in the thickness of the dielectric layer tends to increase. Therefore, the method according to the present disclosure is particularly effective when the width W2 is large (for example, when W2 is 10 mm or more).

(Step (iii))

The step (iii) is a step of forming a plurality of anode bodies to which the anode lead members are connected by cutting the anode substrate after the step (ii) at intervals of the predetermined length L2. The method for cutting the anode substrate is not limited, and the anode substrate may be cut by a known method. At least one (usually one) anode lead member is connected to one formed anode body.

The metal foil is exposed at the cut surfaces formed by the step (iii). However, since the width W2 is shorter than the length L2, the influence of the metal foil exposed in the step (iii) is small. Note that, after the laminate is formed in a step (iv), auxiliary chemical conversion treatment may be performed. In that case, the chemical conversion treatment may be performed under milder conditions (lower applied voltage, chemical conversion liquid having lower electrical conductivity, or the like) than in the chemical conversion treatment in the step (ii-b).

(Step (iv))

The step (iv) is a step of forming a laminate by laminating the anode body, the cathode body, and the separator so that the separator is disposed between the anode body formed in the step (iii) and the cathode body. For example, the strip-shaped anode body, the strip-shaped cathode body, and the strip-shaped separator may be wound such that the separator is disposed between the anode body and the cathode body. Thus, the wound body (laminate) is formed. Alternatively, a plurality of anode bodies, a plurality of cathode bodies, and a plurality of separators may be laminated such that the separators are arranged between the anode bodies and the cathode bodies. The plurality of anode bodies and the plurality of cathode bodies are alternately arranged. The step (iv) can be performed by a known method.

The separator can be a sheet-like material that can be impregnated with an electrolyte, and may be a sheet-like material that has insulating properties and can be impregnated with the electrolyte, for example. The separator may be a woven fabric, a non-woven fabric, or a porous membrane. Examples of materials of the separator include cellulose, polyethylene terephthalate, polybutylene terephthalate, polyphenylene sulfide, vinylon, nylon, aromatic polyamide, polyimide, polyamideimide, polyetherimide, rayon, glass, and the like.

When manufacturing an electrolytic capacitor having a high rated voltage, the surface density of the separator is preferably 20 g/m 2 or more.

(Cathode Body)

The cathode body can be a metal foil (for example, the aluminum foil) that can be used as the cathode of an electrolytic capacitor. The surface of the metal foil may be coated with a layer of carbon, nickel, titanium, or the like.

The thickness of the cathode body is not particularly limited, but may be in a range of 20 μm to 100 μm (for example, in a range of 30 μm to 60 μm). The size and shape of the cathode body are about the same as the size and shape of the anode body.

(Step (v))

A step (v) is a step of impregnating the laminate with a conductive polymer and an electrolytic solution. The method for performing the step (v) is not particularly limited, and can be a known method. In a preferred example, the laminate is first impregnated with the conductive polymer, and then the laminate is impregnated with the electrolytic solution.

The laminate may be impregnated with the conductive polymer by immersing the laminate in a dispersion liquid containing the conductive polymer. Alternatively, the conductive polymer may be placed on the dielectric layer by polymerizing raw material monomers on the dielectric layer of the anode body. These processes may be performed by a known method. By immersing the laminate in the electrolytic solution, the laminate can be impregnated with the electrolytic solution. Thus, the laminate (capacitor element) is obtained in which the separator and the electrolyte are arranged between the dielectric layer of the anode body and the cathode body.

Examples of the conductive polymer include polypyrrole, polythiophene, polyfuran, polyaniline, polyacetylene, a derivative thereof, and the like. These conductive polymers may be used alone or in combinations of two or more. Further, the conductive polymer may be a copolymer of two or more monomers. A preferred example of the conductive polymer is poly(3,4-ethylenedioxythiophene) (PEDOT).

A dopant may be added to the conductive polymer. From the viewpoint of suppressing dedoping from the conductive polymer, it is preferable to use a polymeric dopant. Examples of the polymeric dopant include polyvinyl sulfonic acid, polystyrene sulfonic acid, polyallyl sulfonic acid, polyacryl sulfonic acid, polymethacryl sulfonic acid, poly (2-acrylamido-2-methylpropane sulfonic acid), polyisoprene sulfonic acid, polyacrylic acid, and the like. These may be used alone or in combinations of two or more. A preferred example of the dopant is polystyrene sulfonic acid (PSS).

The electrolytic solution can be a known electrolytic solution used for an electrolytic capacitor. The electrolytic solution may contain a non-aqueous solvent and a base component and/or an acid component dissolved in the non-aqueous solvent. Examples of the non-aqueous solvent include polyhydric alcohols such as ethylene glycol and propylene glycol, cyclic sulfones such as sulfolane (SL), lactones such as γ-butyrolactone (γBL), amides such as N-methylacetamide, N,N-dimethylformamide, and N-methyl-2-pyrrolidone, esters such as methyl acetate, carbonate compounds such as propylene carbonate, ethers such as 1,4-dioxane, ketones such as methyl ethyl ketone, formaldehyde, and the like. Alternatively, the non-aqueous solvent may be polyalkylene glycol, a derivative of polyalkylene glycol, or the like. The non-aqueous solvent of the electrolytic solution may include one type of non-aqueous solvent, or may include a plurality of types of non-aqueous solvents.

Examples of acid components include acids such as maleic acid, phthalic acid, benzoic acid, pyromellitic acid, resorcinic acid, and the like. Inorganic acids such as phosphoric acid, phosphorous acid, hypophosphorous acid, boric acid, fluoroboric acid, tetrafluoroboric acid, and hexafluorophosphoric acid may be used as the acid component. Alternatively, organic acids such as an alkanesulfonic acids such as methanesulfonic acid may be used as the acid component. Alternatively, a composite compound of the organic acid and the inorganic acid may be used as the acid component.

The base component may be a compound having an alkyl-substituted amidine group, for example, an imidazole compound, a benzimidazole compound, an alicyclic amidine compound (pyrimidine compound, imidazoline compound), and the like. Alternatively, a quaternary salt of a compound having an alkyl-substituted amidine group may be used as the base component. Alternatively, a tertiary amine may be used as the base component. One or more solutes may be dissolved in the non-aqueous solvent.

After the step (v), the electrolytic capacitor is manufactured using the laminate (capacitor element) that has undergone the step (v). For example, the capacitor element may be housed in a case and the case may be sealed. The methods for achieving this are not limited, and it is possible to use a known material and a known method. Thus, a hybrid electrolytic capacitor can be manufactured. Note that at least a part of the electrolytic solution may be injected into the case after the laminate is housed in the case.

When only the electrolytic solution is used as the electrolyte, even if an exposed portion (for example, the end surface) of the metal foil is not subjected to the chemical conversion treatment, a certain amount of dielectric layer is formed on the exposed portion by the action of the electrolytic solution. Therefore, in that case, performing chemical conversion treatment on the end surface is not so important. On the other hand, in a hybrid electrolytic capacitor, the amount of the electrolytic solution is small, and therefore the effect of forming the dielectric layer by the electrolytic solution may be insufficient. Therefore, in a hybrid electrolytic capacitor, it is important to form the dielectric layer by performing chemical conversion treatment on the metal foil exposed at the end surface. Further, a hybrid electrolytic capacitor is sometimes required to have a high rated voltage due to its characteristics. In order to achieve a high rated voltage, it is necessary to increase the thickness of the dielectric layer on the end surface. For these reasons, the manufacturing method of the present disclosure is particularly effective when manufacturing a hybrid electrolytic capacitor.

An example of the manufacturing method according to the present disclosure will be specifically described below with reference to the drawings. However, the present disclosure is not limited to the following embodiments. The example of the manufacturing method described below can be modified based on the above description. Further, the matter described below may be applied to the above embodiments. Note that the following figures are schematic diagrams, and the scale (for example, aspect ratio) of illustrated members is different from the scale of actual members.

First Embodiment

A first embodiment describes an example of the manufacturing method according to the present disclosure. First, as illustrated in FIG. 1A, an anode substrate 200 described above is prepared (step (i)). The width of the anode substrate 200 is the width W2 described above, and the length of the anode substrate 200 is the length L1 described above. Two major surfaces 200a of the anode substrate 200 are roughened, and the first dielectric layer (not illustrated) is formed on the surfaces. At an end surface (cut surface) 200s of the anode substrate 200, the metal foil constituting the anode substrate 200 is exposed.

Figure 1B:
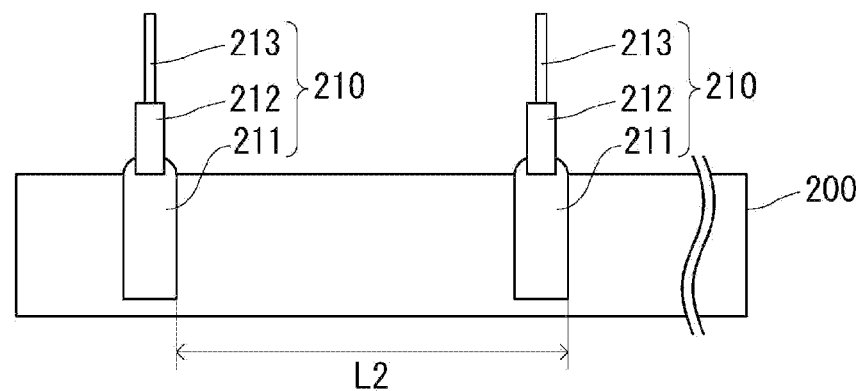
FIG. 1B A diagram schematically illustrating an example of a step following the one step of FIG. 1A.
Figure 2:
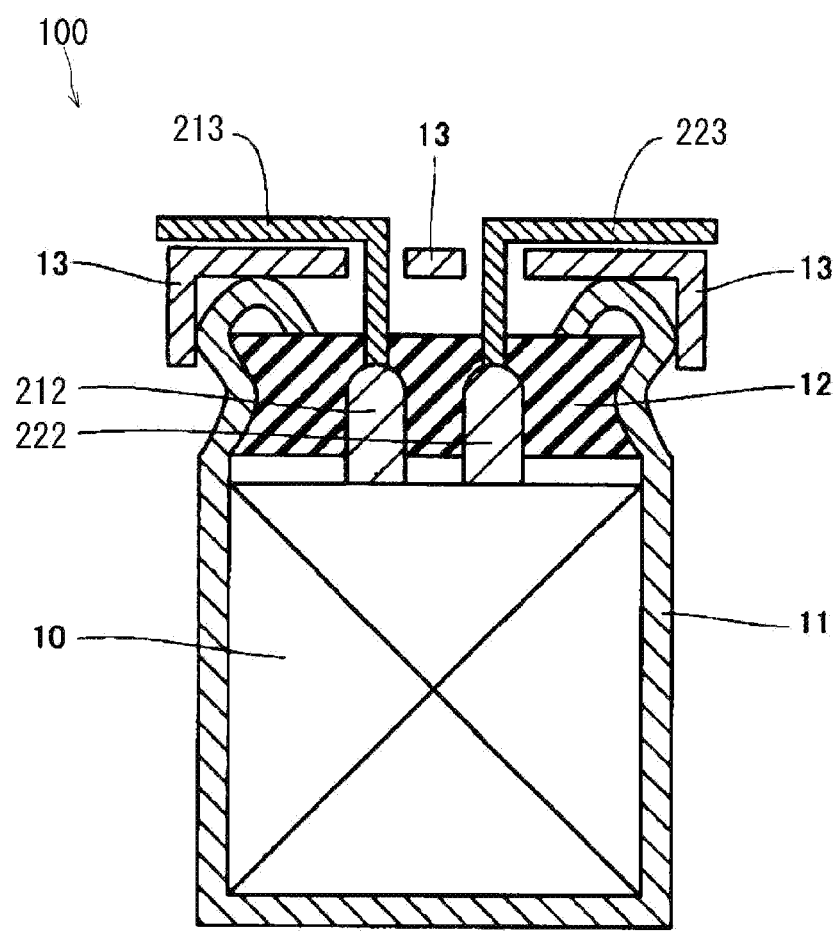
FIG. 2 A cross-sectional view schematically illustrating an example of an electrolytic capacitor manufactured by the manufacturing method according to the present disclosure.

Next, as illustrated in FIG. 1B, a plurality of anode lead members 210 are connected to the anode substrate 200 (step (ii-a)). The anode lead member 210 includes a plate-like portion 211, a bar-like portion (projecting portion) 212 continuous with the plate-like portion 211, and a lead portion 213 continuous with the bar-like portion 212. When the plate-like portion 211 is fixed to the anode substrate 200, the anode lead member 210 is electrically connected to the metal foil constituting the anode substrate 200. The bar-like portion 212 projects from the anode substrate 200. The plurality of anode lead members 210 are fixed to the anode substrate 200 at intervals of the length L2. Although two anode lead members 210 are illustrated in FIG. 2, more anode lead members 210 are connected to the anode substrate 200.

Figure 1C:
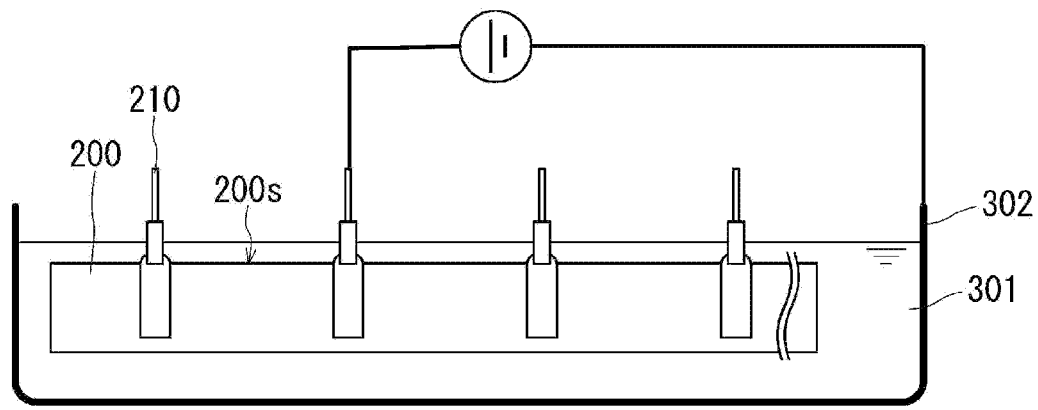
FIG. 1C A diagram schematically illustrating an example of a step following the one step of FIG. 1B.

Next, as illustrated in FIG. 1C, the anode substrate 200 is immersed in a chemical conversion liquid 301 and subjected to chemical conversion treatment. Specifically, a DC voltage is applied between the anode substrate 200 and a counter electrode. FIG. 1C illustrates an example in which a container 302 for the chemical conversion liquid 301 is used as the counter electrode as a conductive container. Of course, the chemical conversion treatment may be performed by arranging a counter electrode separately from the container 302 in the chemical conversion liquid 301. This chemical conversion treatment forms the second dielectric layer (not illustrated) on the end surface 200s of the anode substrate 200 (step (ii-b)). As illustrated in FIG. 1C, it is preferable to perform chemical conversion treatment while the bar-like portions 212 are partially immersed in the chemical conversion liquid 301.

FIG. 1C illustrates an example in which chemical conversion treatment is performed while the anode substrate 200 is not wound. However, as described above, chemical conversion treatment may be performed in the state where the anode substrate 200 is wound into a roll. Since a plurality of the plate-like portions 211 are fixed to the anode substrate 200, even when the anode substrate 200 is wound into a roll, gaps are formed between portions of the anode substrate 200 laminated in the radial direction of the roll. Therefore, even when the anode substrate 200 is rolled into a roll, the chemical conversion liquid sufficiently permeates into the roll.

Figure 1D:
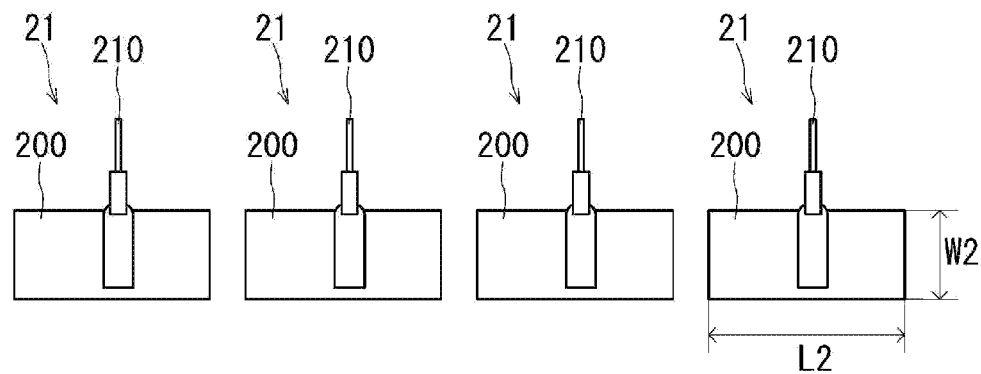
FIG. 1D A diagram schematically illustrating an example of a step following the one step of FIG. 1C.

Next, as illustrated in FIG. 1D, by cutting the anode substrate 200 having the second dielectric layer (not illustrated) at intervals of the predetermined length L2, a plurality of anode bodies 21 to which the anode lead members 210 are connected are formed (step (iii)).

Figure 1E:
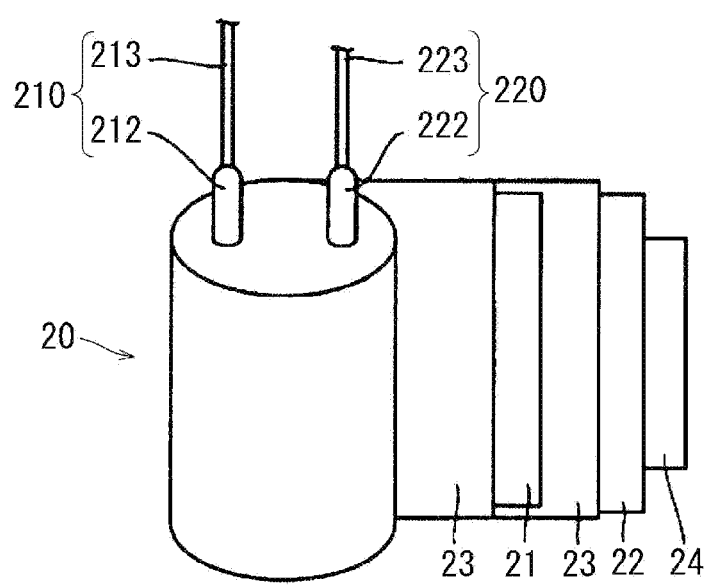
FIG. 1E A diagram schematically illustrating an example of a step following the one step of FIG. 1D.

Next, as illustrated in FIG. 1E, by laminating (winding) the anode bodies 21, a cathode body 22, and a separator 23 such that the separator 23 is disposed between the formed anode bodies 21 and the cathode body 22, a laminate (wound body) 20 is formed (step (iv)). The outermost circumferential surface of the wound body is fixed by a piece of winding stop tape 24. FIG. 1E illustrates a partially unrolled state before fixing the outermost circumferential surface of the winding body. A cathode lead member 220 is connected to the cathode body 22. Like the anode lead member 210, the cathode lead member 220 includes a plate-like portion (not illustrated), a bar-like portion (projecting portion) 222, and a lead portion 223.

Next, the laminate 20 is impregnated with the conductive polymer and the electrolytic solution by the method described above (step (v)). In this way, a capacitor element 10 is formed. An electrolytic capacitor 100 illustrated in FIG. 2 is obtained by housing the formed capacitor element 10 in a case 11.

The electrolytic capacitor 100 illustrated in FIG. 2 includes the capacitor element 10, a bottomed cylindrical case 11 housing the capacitor element 10, a sealing member 12 closing an opening of the case 11, and a seat plate 13 covering the sealing member 12. The capacitor element 10 is housed in the case 11. A portion of the case 11 in the vicinity of the open end is constricted inward, and the open end of the case 11 is curled so as to crimp the sealing member 12.

INDUSTRIAL APPLICABILITY

The present disclosure is applicable to an electrolytic capacitor manufacturing method.

Although the present invention has been described in terms of presently preferred embodiments, such disclosure should not be construed as limiting. Various variations and modifications will no doubt become apparent to those skilled in the art to which the invention pertains after reading the above disclosure. Therefore, the appended claims are to be interpreted as covering all variations and modifications that can be implemented without departing from the true spirit and scope of the invention.

REFERENCE SIGNS LIST 10 capacitor element
11 case
12 sealing member
20 laminate
21 anode body
22 cathode body
23 separator
100 electrolytic capacitor
200 anode substrate
200a major surface
200s end surface
210 anode lead member
211 plate-like portion
212 bar-like portion
213 lead portion
220 cathode lead member
223 lead portion
301 chemical conversion liquid

The invention claimed is:

1. A manufacturing method for an electrolytic capacitor including a laminate of an anode body having a length L2 and a width W2 and having a dielectric layer formed on a surface of the anode body, a separator, and a cathode body, the manufacturing method comprising:
a step (i) of preparing an anode substrate including a strip-shaped metal foil having a length ten times the length L2 or more and having the width W2, and first dielectric layers formed on two major surfaces of the metal foil, the metal foil being exposed at an end surface of the anode substrate;
a step (ii) of connecting a plurality of anode lead members to the anode substrate and forming a second dielectric layer on the end surface;
a step (iii) of forming a plurality of the anode bodies to which the anode lead members are connected by cutting the anode substrate at the length L2 after the step (ii);
a step (iv) of forming the laminate by laminating the anode body, the cathode body, and the separator in such a manner that the separator is disposed between the anode body formed in the step (iii) and the cathode body; and
a step (v) of impregnating the laminate with a conductive polymer and an electrolytic solution,
wherein the step (ii) includes:
a step (ii-a) of connecting the plurality of anode lead members to the anode substrate; and
a step (ii-b) of forming the second dielectric layer on the end surface by immersing the anode substrate in a chemical conversion liquid and subjecting the anode substrate to chemical conversion treatment.

2. The manufacturing method according to claim 1, wherein the second dielectric layer having a thickness of 150 nm or more is formed in the step (ii-b).

3. The manufacturing method according to claim 1, wherein the anode substrate is subjected to the chemical conversion treatment with a chemical conversion voltage of 200 V or more in the step (ii-b).

4. The manufacturing method according to claim 1, wherein the step (ii-b) is performed after the step (ii-a) in the step (ii).

5. The manufacturing method according to claim 1, wherein the chemical conversion treatment is performed in a state where the anode substrate is wound in the step (ii-b).

6. The manufacturing method according to claim 1, wherein a surface density of the separator is 20 g/m² or more.

7. The manufacturing method according to claim 1,
wherein the anode lead member includes a connecting portion made of a metal and connected to the anode substrate, and a lead portion connected to the connecting portion,
the connecting portion includes a plate-like portion in contact with the anode substrate, and a projecting portion projecting from the anode substrate and not in contact with the anode substrate,
the projecting portion has a length of 2 mm or more, and
a portion of the projecting portion immersed in the chemical conversion liquid has a length of 1 mm or less in the step (ii-b).

8. The manufacturing method according to claim 1, wherein an electrical conductivity of the chemical conversion liquid is 0.1 mS/cm or more.

9. The manufacturing method according to claim 1, wherein a rated voltage of the electrolytic capacitor is 100 V or more.

10. A manufacturing method for an electrolytic capacitor including a laminate of an anode body having a length L2 and a width W2 and having a dielectric layer formed on a surface of the anode body, a separator, and a cathode body, the manufacturing method comprising:
- a step (i) of preparing an anode substrate including a strip-shaped metal foil having a length two times the length L2 or more and having the width W2, and first dielectric layers formed on two major surfaces of the metal foil, the metal foil being exposed at an end surface of the anode substrate,
- a step (ii) of connecting a plurality of anode lead members to the anode substrate and forming a second dielectric layer on the end surface;
- a step (iii) of forming a plurality of the anode bodies to which the anode lead members are connected by cutting the anode substrate at the length L2 after the step (ii);
- a step (iv) of forming the laminate by laminating the anode body, the cathode body, and the separator in such a manner that the separator is disposed between the anode body formed in the step (iii) and the cathode body;
- a step (v) of impregnating the laminate with a conductive polymer and an electrolytic solution,
- wherein the step (ii) includes:
  - a step (ii-a) of connecting the plurality of anode lead members to the anode substrate; and
  - a step (ii-b) of forming the second dielectric layer on the end surface by immersing the anode substrate in a chemical conversion liquid and subjecting the anode substrate to chemical conversion treatment, and
- the width W2 is 10 mm or more.

* * * * *